Nov. 15, 1949   W. R. HARRIS   2,488,404
PRESET SPEED CONTROL SYSTEM FOR DRIVES
Filed Sept. 27, 1947
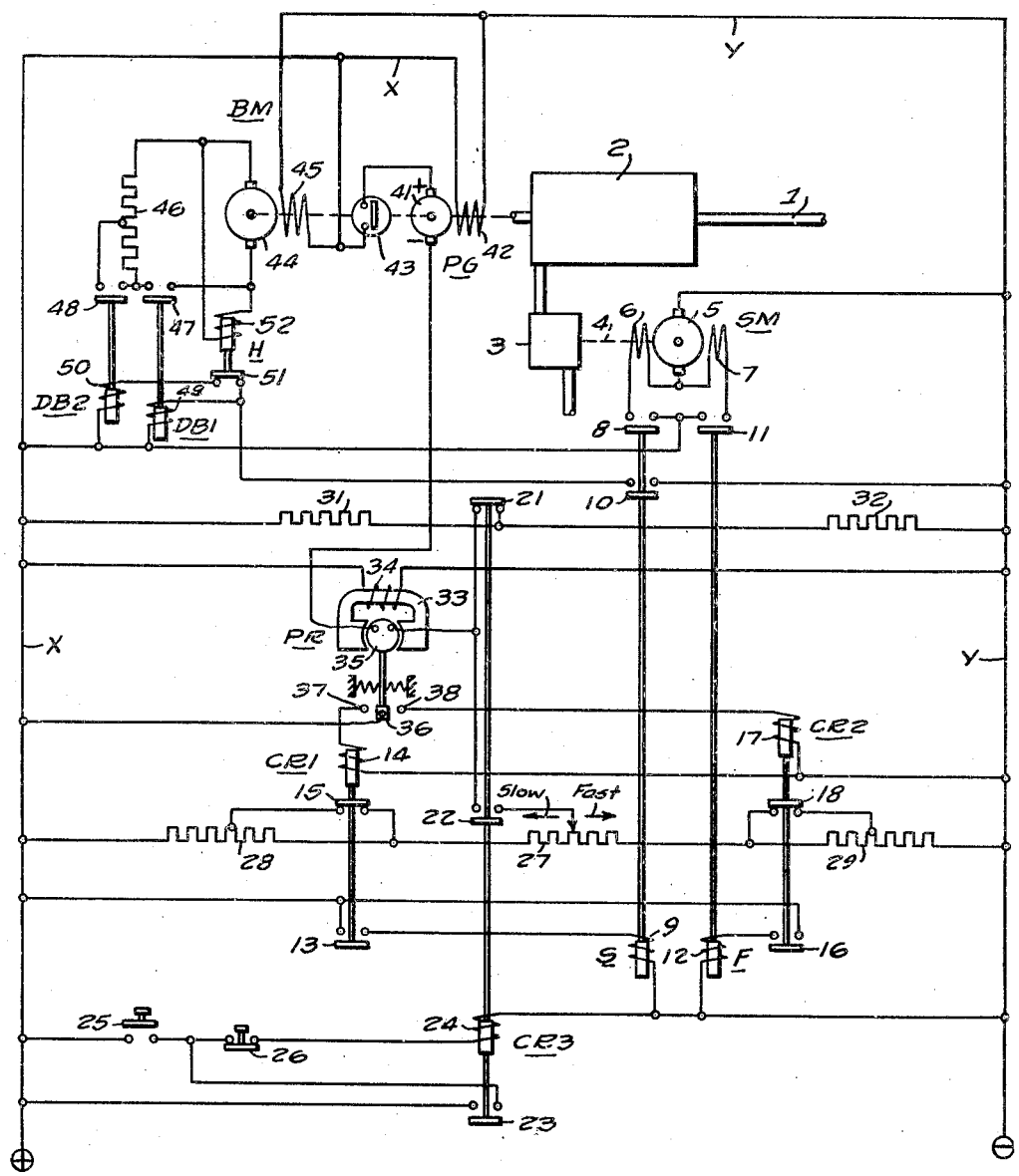
WITNESSES:
INVENTOR
Walter R. Harris.
BY
ATTORNEY Patented Nov. 15, 1949

2,488,404

UNITED STATES PATENT OFFICE 2,488,404

PRESET SPEED CONTROL SYSTEM FOR DRIVES

Walter R. Harris, Pittsburgh, Pa., assignor to Westinghouse Electric Corporation, East Pittsburgh, Pa., a corporation of Pennsylvania Application September 27, 1947, Serial No. 776,522

5 Claims. (Cl. 137—158)

My invention relates to systems for controlling speed-adjustable drives to operate at a set speed, and more in particular to a control system in which the speed changing equipment for the drive is operated by a reversible electric motor. In its preferred, though not exclusive, aspect, the invention deals with a preset speed control system for regulating the operation of prime movers such as turbines.

A known preset speed control system for the above-mentioned purposes comprises a polarized electromagnetic contact relay arranged in a bridge circuit whose branches include a manually operated speed-setting rheostat and a follow-up rheostat, the latter being automatically adjusted by the reversible motor for changing the speed of the main drive. The bridge is balanced and the relay in neutral position when the drive speed has the desired value set by the manually adjusted rheostat. When the drive speed departs from the desired value, the bridge is unbalanced and causes the relay to deflect one or the other way depending upon the direction of the departure. The relay contacts then energize the speed change motor which varies the drive speed as well as the adjustment of the follow-up rheostat until the drive speed is corrected and the bridge again balanced.

It is an object of my invention to provide a preset speed control system for drives, including turbine or other prime-mover equipment, which secures satisfactory operation independently of whether the positional condition of the prime-mover speed regulator is always an accurate criterion of the drive speed, which does not require a mechanical transmission between the speed-change motor and the speed-setting resistance circuit, and which permits obtaining a more rapid response to wide-range changes in speed than afforded by the known follow-up type control.

These and other objects and features of my invention will be apparent from the embodiment of the invention shown in the drawing and described hereinafter.

The drawing illustrates schematically a turbine drive for fabricating equipment, for instance, for paper making or processing machinery. The line shaft of the equipment is denoted by 1, and the driving turbine by 2. The speed governor 3 of the turbine is connected by a suitable transmission 4 to the armature 5 of a speed-change motor SM of the reversible type. The field windings 6 and 7 of motor SM are selectively energized from a suitable source of substantially constant direct-current voltage, here represented by mains X and Y. Field winding 6 when energized causes motor SM to adjust the governor 3 for lower drive speeds while field winding 7, when energized, adjusts the governor for faster speeds. The excitation of field winding 6 is controlled by the contact 8 of a "slow" relay S whose coil 9 controls also an auxiliary contact 10. The circuit of field winding 7 is controlled by the contact 11 of a "fast" relay F whose coil is denoted by 12.

The coil circuit for relay S is energized from mains X and Y under control by the contact 13 of another relay CR1 whose coil 14 actuates also an auxiliary contact 15. The coil circuit for relay F, also energized from mains X and Y, is controlled by the contacts 16 of a relay CR2 whose coil 17 actuates also an auxiliary contact 18.

The control system includes also a control relay CR3 with three contacts 21, 22 and 23 actuated by a coil 24 whose circuit has a normally open "run" contact 25 and a normally closed "thread" contact 26, both contacts being preferably designed as push-button switches.

A manually adjustable speed setting rheostat is denoted by 27. Numerals 28, 29, 31 and 32 denote resistors whose operation is controlled by the relays CR1, CR2 and CR3 in the manner described below.

A polarized relay PR serves to sense any departure of the turbine speed from the speed value preset by rheostat 27. The magnetic field system 33 of relay PR is magnetized by a field coil 34 energized from mains X and Y. The movable relay coil 35 is spring-biased to normally remain in mid-position in which an appertaining movable contact 36 is disengaged from two stationary contacts 37 and 38. Movement of relay coil 35 and contact 36 to the left causes relay CR1 to pick up, while movement of relay coil 35 and contact 36 to the right causes picking up of relay CR2.

Driven from the line shaft 1 is the armature 41 of a pilot generator PG whose field winding 42 receives constant excitation from mains X and Y. Connected to the pilot generator is a zero switch 43 whose contact closes only when the generator speed is above a given minimum value. Various types of known centrifugal switches may be used for this purpose.

The armature 44 of a braking motor BM is also connected to or mounted on the line shaft. The appertaining field winding 45 is energized from mains X and Y. The armature circuit of motor BM includes a dynamic braking resistor whose insertion into the circuit is controlled by the contacts 47 and 48 of two brake control relays DB1 and DB2 with respective control coils 49 and 50. The coil circuit of relay DB1 is controlled by the above-mentioned contact 10 of the "slow" relay S. The coil circuit of relay DB2 is controlled by the contact 51 of a voltage relay H whose coil 52 is connected across the motor armature 44.

When the turbine 2 is running, the actuation of "run" button 25 causes relay CR3 to pick up. Thereafter, relay CR3 remains picked up, due to its self-holding circuit closed by the contact 23, until button 26 is depressed by the operator. With relay CR3 picked up and the turbine running at the desired speed preset by the rheostat 27, the other relays of the control system remain in the illustrated positions with the exception of relay H which is in picked up position due to voltage generated across armature 44. The pilot generator PG now supplies voltage proportional to the turbine speed. This voltage opposes the voltage drop tapped from the speed rheostat 27 and is equal to this voltage drop when the turbine speed has the desired value. Consequently, no current is then flowing through coil 35 of relay PR.

When the speed rheostat 27 is moved toward the fast position, the voltage drop across rheostat 27 exceeds the pilot generator voltage and causes a current to flow through relay coil 35 in such a direction as to close contacts 36 and 38. As a result, coil 17 of relay CR2 is energized. Contact 16 closes and causes relay F to energize, at contact 11, the field winding 7 of motor SM. Motor SM now runs in the direction required to set the governor 3 for a faster speed of turbine 2. When the speed has risen to the value at which the pilot generator voltage equals the voltage drop across the tapped off portion of rheostat 27, the current in relay coil 35 becomes zero and contacts 36 and 38 open so that relays CR2 and F drop off and stop the motor SM.

When the rheostat 27 is adjusted toward the slow position, current flows through coil 35 of relay PR in the opposite position so that contacts 36 and 37 close and cause relays CR1 and S to pick up, thus energizing the motor field winding 6 for changing the adjustment of governor 3 toward reduced turbine speeds. When the speed reaches the desired reduced value, the current flow through relay coil 35 again becomes zero so that relays PR, CR1 and S drop off and stop the motor SM.

Of course, if the speed rheostat 27 is left in a selected position, any change in the drive speed due to other conditions causes a similar unbalancing to occur between the pilot generator voltage and the potentiometric rheostat voltage so that the relay PR operates to adjust speed change motor SM and governor 3 in the direction and to the extent required to maintain or reestablish the desired speed.

If the speed change motor tends to operate at high speed, the system is liable to overshoot. In order to prevent this, the auxiliary contacts 15 and 18 of relays CR1 and CR2 are connected across respective resistors 28 and 29 in the circuit of the speed rheostat 27. Assume that the rheostat 27 is adjusted toward the fast position and relay CR2 operates. When this happens, the contact 18 of relay CR2 opens and inserts into the rheostat circuit a resistor which recalibrates the speed rheostat 27 to call for a slightly lower speed. When the drive speed comes close to the correct value, relay contacts 36 and 38 open so that relay CR2 drops out and shorts the resistor 29. Under this condition the system senses that it is not at the proper speed and again energizes the relays PR and CR2 to cause an additional movement of the speed change motor SM. Thus, a vibrating condition is set up until the system has adjusted itself to the proper speed. A similar vibratory operation of relays PR and CR1 occurs when the speed setting of rheostat 27 is changed in the slow direction.

In the illustrated embodiment of a control system for a turbine drive, the application of a braking motor BM with associated circuits of the illustrated type serves to quickly slow down the line shaft speed because the turbine cannot develop braking torque. When the "slow" relay S closes its contacts to operate motor SM for reducing the turbine speed, the contact 10 closes the circuit of coil 49 so that braking relay DB1 picks up and connects the resistor 46 across motor armature 44 for dynamic braking. The voltage relay H drops out when the motor speed passes through a given low value and then causes relay DB2 to short-circuit part of resistor 36 for increased braking.

When the "thread" button 26 is depressed, relay CR3 is deenergized and connects the armature 41 of pilot generator PG across the fixed resistors 31 and 32. As a result, the system is adjusted for a fixed minimum speed, regardless of the setting of the rheostat 27. When, thereafter, the button 26 is released and the "run" button 25 depressed, the drive accelerates to the speed prescribed by the setting of the rheostat 27.

If the turbine is shut down with mains X and Y energized, the current flowing through coil 35 of relay PR might damage the instrument if allowed to flow too long, but this is prevented by the zero speed switch 43 which opens the relay coil circuit when the pilot generator is at zero speed.

While I have exemplified the invention with particular reference to a turbine drive, it will be obvious that it can also be applied in conjunction with prime movers or motors of other types. It will also be understood by those skilled in the art that the various circuit elements and circuit connections may be altered and modified in various respects without departing from the objects, advantages and essential features of my invention, and within the scope of the claims hereto annexed.

I claim as my invention:

1. A system for controlling a drive to operate at a preset speed, comprising drive-speed regulating means having a reversible electric speed-change motor, a pilot generator for providing a speed measuring voltage, a potentiometric circuit having a rheostat adjustable for providing a voltage indicative of the preset speed, a polarized relay having a control circuit connected with said pilot generator and with said rheostat so as to directionally respond to departure of said voltages from a given differential value, circuit means disposed between said relay and said speed-change motor for controlling said motor to vary the drive speed in the direction required to maintain said value, and a zero speed switch mechanically connected to said pilot generator and electrically connected in said control circuit for opening said control circuit when said generator voltage is below a given minimum.

2. A system for controlling a drive to operate at a preset speed, comprising drive-speed regulating means having a reversible electric speed-change motor, a pilot generator for providing a speed measuring voltage, a potentiometric circuit having a rheostat adjustable for providing a voltage indicative of the preset speed and having controllable resistance means for recalibrating, when operative, said potentiometric circuit in speed-reducing sense, a polarized relay connected with said pilot generator and with said rheostat so as to directionally respond to departure of said voltages from a given differential value, and circuit means connecting said relay with said speed-change motor for controlling said motor to vary the drive speed in the direction required to maintain said value, said circuit means having a control relay controlled by said polarized relay and connected to said resistance means for rendering said resistance means operative when said polarized relay responds to said departure so that said two relays act vibratorily for intermittent control of said motor.

3. A system for controlling a drive to operate at a preset speed, comprising drive-speed regulating means having a reversible electric speed-change motor, a pilot generator for providing a speed measuring voltage, a potentiometric circuit having a rheostat adjustable for providing a voltage indicative of the preset speed and having two controllable resistance means disposed for changing the calibration of said potentiometric circuit in speed reducing sense, a polarized relay having a movable contact normally in midposition and two stationary contacts selectively engageable by said movable contact when the latter deflects from said midposition in opposite directions respectively, said polarized relay having a control circuit for controlling said movable contact, said generator and said rheostat being connected with said control circuit so that said movable contact deflects in response to the differential value of said two voltages, normally inactive first relay means connected with said motor for controlling it to run in one direction, normally inactive second relay means connected with said motor for controlling it to run in the other direction, said first and second relay means being connected with said respective resistance means for changing said calibration when said relay means are active and being connected to said respective stationary contacts to become active when said movable contact engages said respective stationary contacts.

4. A system for controlling a drive to operate at a preset speed, comprising drive-speed regulating means having a reversible electric speed-change motor, a pilot generator for providing a speed measuring voltage, a potentiometric circuit having a rheostat adjustable for providing a voltage indicative of the preset speed, potentiometric means for providing a voltage indicative of a given minimum speed, a polarized relay, selective contact means normally connecting said polarized relay and said generator with said rheostat to normally make said relay directionally respond to the differential value of said respective voltages provided by said generator and said rheostat, said contact means being operable to connect said polarized relay and said generator with said potentiometric means to make said relay respond to the differential value of said respective voltages provided by said generator and said potentiometric means to then run said motor at minimum speed, and circuit means connecting said relay with said motor for controlling said motor to regulate the drive speed in the direction required to maintain said respective differential values.

5. With a turbine having a speed governor, the combination of an electric braking dynamo having an armature mechanically connected to the turbine and having a normally open dynamic braking circuit disposed across said armature, a pilot generator mechanically connected to the turbine to provide speed-responsive voltage, a potentiometric circuit having an adjustable rheostat for providing a voltage indicative of desired speed, a polarized relay connected to said generator and said rheostat to directionally respond to departure of said two voltages from mutual balance, a reversible speed-change motor in driving connection with the governor, control relay means disposed between said relay and said motor for causing said motor to adjust the governor in the direction required to maintain voltage balance, and contact means associated with said braking circuit and controlled by said relay means to close said braking circuit when that governor is adjusted in speed reducing sense.

WALTER R. HARRIS.

REFERENCES CITED

The following references are of record in the file of this patent:

UNITED STATES PATENTS

| Number | Name | Date |
|---|---|---|
| 1,832,816 | Nerad | Nov. 17, 1931 |
| 1,833,048 | Cutler | Nov. 24, 1931 |
| 1,836,992 | Schade et al. | Dec. 15, 1931 |
| 2,281,844 | Jones | May 5, 1942 |